United States Patent [19]
Bergson

[11] 3,807,871
[45] Apr. 30, 1974

[54] TRISTIMULUS FILTER COLORIMETER WITH IMPROVED METER ZERO SETTING MEANS

[76] Inventor: Gustav Bergson, Cedarbrook Hill Apts., 11, Wyncote, Pa. 19095

[22] Filed: June 12, 1972

[21] Appl. No.: 262,168

[52] U.S. Cl.................. 356/173, 356/176, 250/226, 356/225
[51] Int. Cl. ............................................. G01j 3/50
[58] Field of Search.................... 356/173, 178, 219; 250/226; 209/111.5, 111.6

[56] References Cited
UNITED STATES PATENTS
2,774,276  12/1956  Glasser et al. ...................... 356/176
3,340,764  9/1967  Bergson .......................... 220/226 X

OTHER PUBLICATIONS

Glasser et al., J. Optical Soc. of America, Vol. 42, No. 9, September 1952, p. 652–660.

Primary Examiner—John K. Corbin
Assistant Examiner—R. J. Webster
Attorney, Agent, or Firm—Joseph Gray Jackson

[57] ABSTRACT

The invention presents rapid means for maintaining absolute scale accuracies of the three filter parameter Colormaster while adding, for example, 16 additional filter parameters. Application to both fluorescent type and non-fluorescent type instrumentation is included.

6 Claims, 8 Drawing Figures

PATENTED APR 30 1974 3,807,871
SHEET 1 OF 2
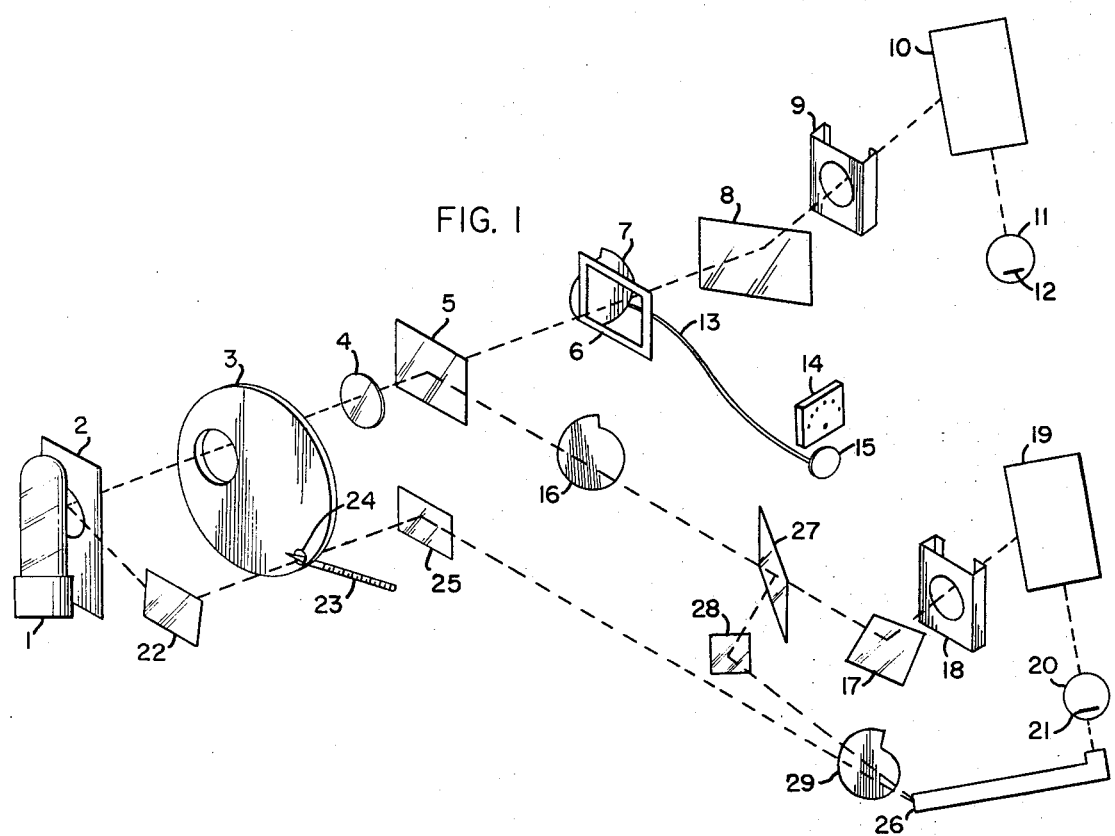
FIG. 1
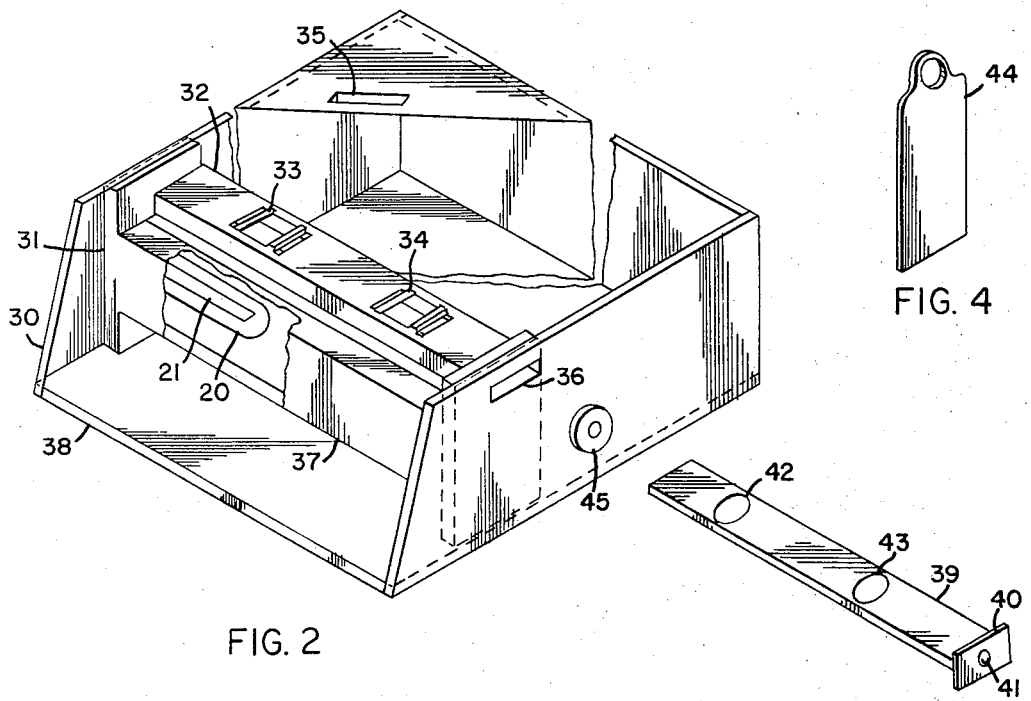
FIG. 2
FIG. 3
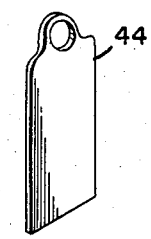
FIG. 4

TRISTIMULUS FILTER COLORIMETER WITH IMPROVED METER ZERO SETTING MEANS

Instrumentation yielding measurements of reflectance and transmission was well established on a differential basis in terms of parameters R, G and B utilizing U.S. Pat. No. 2,774,276 of Glasser et al in the Colormaster Differential Colorimeter, incorporated by reference and establishment of a means for setting the low ends of the scales for these parameters in U.S. Pat. No. 3,340,764 of Bergson, incorporated by reference permitted manufacture of the Model V Colormaster as an absolute measuring instrument. In the latter instance it was practical to incorporate independent zero setting means for each parameter and this was aided in acceptability by their long time stability.

Present demands in this field call, for example, for measurements in terms of sixteen additional parameters, these consisting of narrow ranges of the visible spectrum as defined by narrow band interference filters. It is not practical to include independent fixed zero setting means for such a quantity of parameters.

It is desirable to have a means for separating those fixed factors affecting measurements from those arising from the change of filter parameters and having established this it is desirable to have a means whereby a single simple adjustment essentially can establish simultaneously both high and low ends of the scales as one changes from one filter parameter to another. It is a purpose of this invention to meet these requirements.

For an instrument having the degree of precision of the Colormaster, that is, with readings to hundredths of a percent over a range of 0 to 100 percent, it is a time consuming operation to move back and forth between upper and lower ends of the scales to make final adjustments of these. It is desirable to have a means for substituting the zero scale condition onto the 100 scale condition without requiring any time consuming operation while permitting effectively the accurate adjustment of both ends of the scale. It is a purpose of this invention to present such a means.

It also is desirable to have a substitution means for establishing the value to be used for the above zero scale condition and it is a purpose of this invention to present such a means.

It is a further purpose of this invention to include it's application to both fluorescent and non-fluorescent type instrumentation.

FIG. 1 is a schematic view of the colorimeter of the invention.

FIG. 2 is a perspective exploded view of a colorimeter omitting many of the features shown in FIG. 1.

FIG. 3 is a perspective view of the slide for insertion in FIG. 2.

FIG. 4 is a perspective view of the color control.

Figure 5:
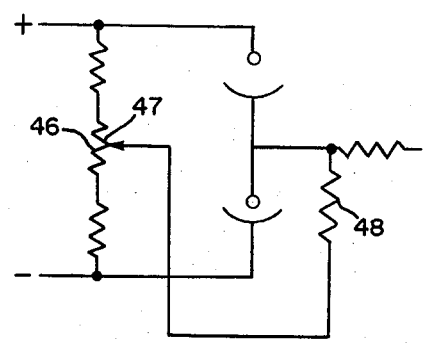
FIG. 5 is an electrical diagram of the electric circuit of FIG. 1.

The invention will be understood better by reference to the figures in which FIG. 1 is a schematic drawing showing the major optical features of the Glasser et at, U.S. Pat. No. 2,774,276 Colormeter, the major additional features of Bergson, U.S. Pat. No. 3,340,764 and that part of the present invention concerned with the first objective.

In FIG. 1, Glasser et al had a lamp source 1, a filter wheel 3, a lens 4, a first beamsplitting mirror 5, a light mask 6, a first cam 7 having an accurate positioning means via shaft 13, control 15, and indicator 14, a first mirror 8, a transmission port 9, a reflectance panel port 10, a first phototube 11, with cathode 12, 6 to 12 being in a first light path projected from beamsplitter 5 and away from lamp 1, and a second cam 16, a second mirror 17, a second transmission part 18, a sample reflectance port 19, a second phototube 20 with cathode 21, 16 to 20 being in a second light path projected from beamsplitter 5 and away from lamp 1. Bergson added a third mirror 22, a zeroing screw means 23, a zeroing aperture means 24, a zeroing aperture mirror means 25 and a light pipe 26.

In the Bergson addition there were individual zeroing screws, apertures and mirrors for each filter parameter and this was practical in view of the limited number of parameters. Each zero screw only required readjustment over a long period of time, that is many weeks and by use of these auxiliary light injection means it was possible to establish true zero points on the measurement scales. Thus by inserting a light blocking pad in sample transmision port 18, the condition of zero reflectance or transmission is simulated. By opening cam 7, say 2 percent from the approxmately closed position with respect to the aperture of mask 6, (this is only shown schematically here), and opening the zero screw 23 to admit light, as required, for balance, a zero condition is established and the indicator 14 can be set to zero to establish this end of the scale. In this condition extraneous contributors to phototube circuit currents, such as so called dark currents, plus the uncertain cam closed position have been taken care of and a precise zero condition is established. (Attempting to establish a true cam position where light passage is just cut off is essentially an impossible task).

Glasser et al and Bergson used cam 16 for adjustment to balance for the high scale end position (auxilliary electrical color controls can be omitted at this point) Thus with a standard reference panel (usually white), at 10, and with a known sample, (usually white), at 19, cam 7 is set so that the indicator 14 reads the reflectance of the known sample for the particular filter parameter. Then cam 16 is adjusted, via a front panel control not shown, to intercept or pass light as required for balance. Under these conditions the instrument is now set up for measurement and the same procedure is repeated for the other two filter parameters (In some cases an added filter parameter with appropriate zero screw additions was used to take account of the work of White and Jacobson in the extreme blue end of the visible spectrum).

In usage of the present invention we consider FIGS. 2, 3 and 4 which show some additional features of the Colormaster as required for use of this invention in fluorescent measurements. Thus, as before, 20 is the measuring phototube, 21 its cathode, 30 the Colormaster case, 31 the phototube housing, 32 a mounting for added glass as required in 33 and 34, 35 a slot in the lid for insertion of light cut-off slide 44, 36 shows opening for insertion of filter holder 39, 40 is the front and 41 is the handle of 39, while 42 and 43 are locations of filters for fluorescent measurements, 45 is the knob controlling the position of light pipe entrance cam 29 of FIG. 1.

In the use of the present invention light cut off slide 44 is inserted into 35 cutting off all light to lens 4 of FIG. 1. From this point it has been advantageous to operate with the filter switch in only one position and the green position has been used. It is a feature of this invention that the need for the extra color controls and extra filter switch positions of the Model V instrument is eliminated with consequent economy in this direction. Thus, all procedures, for both wide and narrow band measurements use one position and one color control.

The filter switch is placed in the green position making contacts with the green color control 46 of FIG. 5. (Whereas, Glasser et al and Bergson used this control for adjustment at the high scale setting, it is advantageous to use it here, as required, for the low scale setting and, in particular, for the extraneous current balance herein described). With light cut-off slide 44 inserted and with the arm of color control 46 in mid-position, the zero screw 23 is withdrawn approximately five turns, the light pipe cut-off cam 45 is retracted approximately six turns from its end position (beyond cut-off) and the color control knob 47 is adjusted to inject a balancing current into the phototube resistor 48. This balance is obtained with very little adjustment of 47 and establishes a starting condition for instrument setup. Light cut-off slide 44 is removed, it has been found advantageous to use Karl Luer barium sulfate reflectance standards, with reflectance taken at 100 percent, for instrument set up and one of these is placed at reference port 10 and one at sample port 19. A blocking pad is inserted at transmission port 18 establishing zero reflectance and measuring cam-7 is set to 1 percent from the cam closed position, indicator 14 being reset to zero at this point. Filter holder 40 with two filters is inserted at 36 and knob 45 is adjusted to admit light to phototube 20, as required, to balance the light to reference phototube 11 in the zero indicator position. (This corresponds to the cam opening as indicated above). The measuring cam 7 is now moved to to provide a reading of 100 on indicator dial 14 with the blocking pad removed from 18, so that it is indicating the reflectance of the barium sulfate at the sample port 19. The cam 16 is now adjusted for balance, adding or subtracting light to phototube 20. In the present invention there is an added beam-splitter, (in this case, a piece of clear glass), after cam 16 which reflects light to mirror 28, and from there past light pipe entrance cam 29 to light pipe 26 and finally to phototube 20. The light passing by way of this path is approximately in the ratio of one to one hundred with respect to the light passing thru 18 so that as the cam 16 is adjusted, opening or closing, to compensate for the particular filter parameters inserted via 40, the 1 percent zero offset opening of 7 gets an approximately compensating adjustment via 27 and 28. This has the effect that, when the blocking pad is reinserted in 18, and cam 7 returned to indicator zero position very slight adjustment of 45 is required for balance and a similar situation prevails at 100 if conditions are set up for a check at this point. (It is quite possible that one is establishing precisions of measurement under these circumstances which go beyond those customarily obtained). However, the procedure outlined is tedious.

Figure 6:
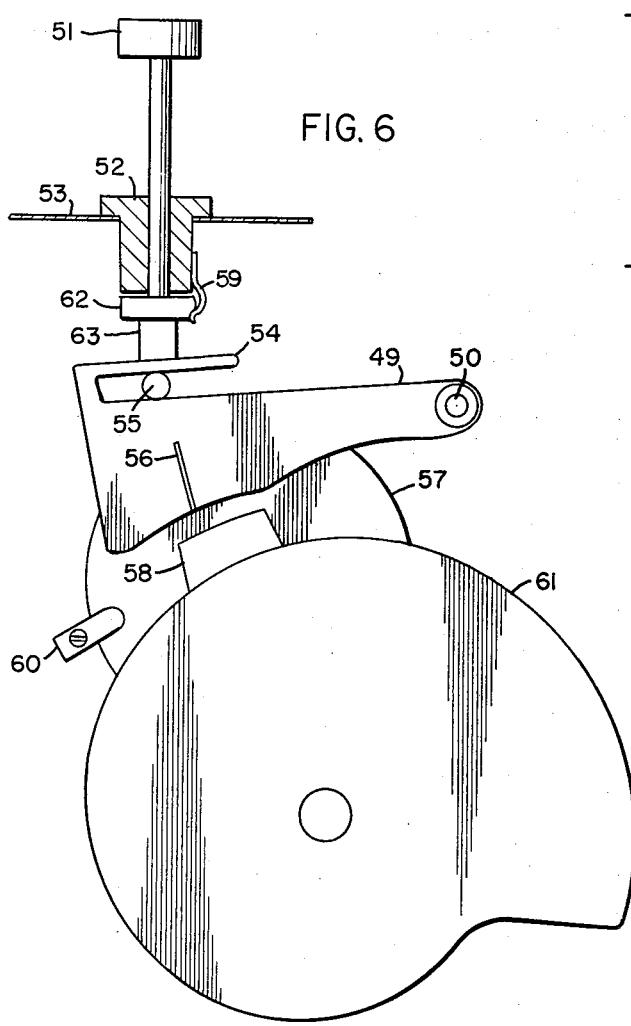
FIG. 6 is a diagram of the zero simulating system which may be used in FIG. 1.

In the present invention passage back and forth from 0 to 100 is avoided by using a zero simulating system shown in FIG. 6. In this system a second light mask 49 is added supplemental to light mask 6, this mask being mounted to permit accurate rotation around a bearing at 50. Mask 49 includes a folded arm 54 into which there is projected a right angled extension from shaft 63, this shaft being directly coupled to handle 51 via bushing 62, this bushing having a protrusion so that when handle 51 is up, spring clip 59 snaps into the bushing to identify that this condition is reached. The cam 49 completely uncovers the opening 58 of mask 57, (this corresponds to mask 6 of FIG. 1) when it is up. The handle 51 is above the case 53 and 52 is a bushing threading this case.

In operation cam 7 is set at 100, handle 51 is pushed down to the point where mask 49 is against cam 7. A slot is located in 49 approximately at right angles to the line of contact between 49 and 7 and approximately midway between the sides of mask opening 58. The slot 56 has been made to pass the light corresponding to the 1 percent opening of cam 7 at zero reflectance position. In practice with 51 down, blocking pad in 18, counter at 100, knob 45 is adjusted to pass light to phototube 20 to balance that passed through the slot 56 to phototube 11. Handle 51 is then pulled up and the stored light addition by the movement of 45, which equals the slot 56 light, is measured by moving cam 7 to balance. In practice this came to 1.12 percent requiring displacement of the zero position to this point. This figure was essentially constant for all filters in the visible spectrum so that it is possible to set the reflectance indicator 14 at 100, insert the blocking pad and balance for zero, remove the blocking pad and balance for 100 with very minor subsequent rebalances but in no case with any movement of the reflectance cam up or down, and the balancing from one filter parameter to the next is quite rapid.

Non-fluorescent measurements can be made with the fluorescent type arrangement described above. The narrow band filters are not exactly the same for a particular spectral region and although they are close enough for the use noted previously, when account is taken of the fact that the same can be said of phototubes, the differences make it desirable to use the same filter when comparing fluorescent and non-fluorescent behaviour. On this account the right side of the instrument is used for inserting the filter pair of holder 39 into slot 36. This permits the non-fluorescent measurement to be made by inserting 39 into slot 35 in which case the same filter is used for the measuring beam, in the latter case for both beams. Single filters can be used also, if desired.

Figure 7:
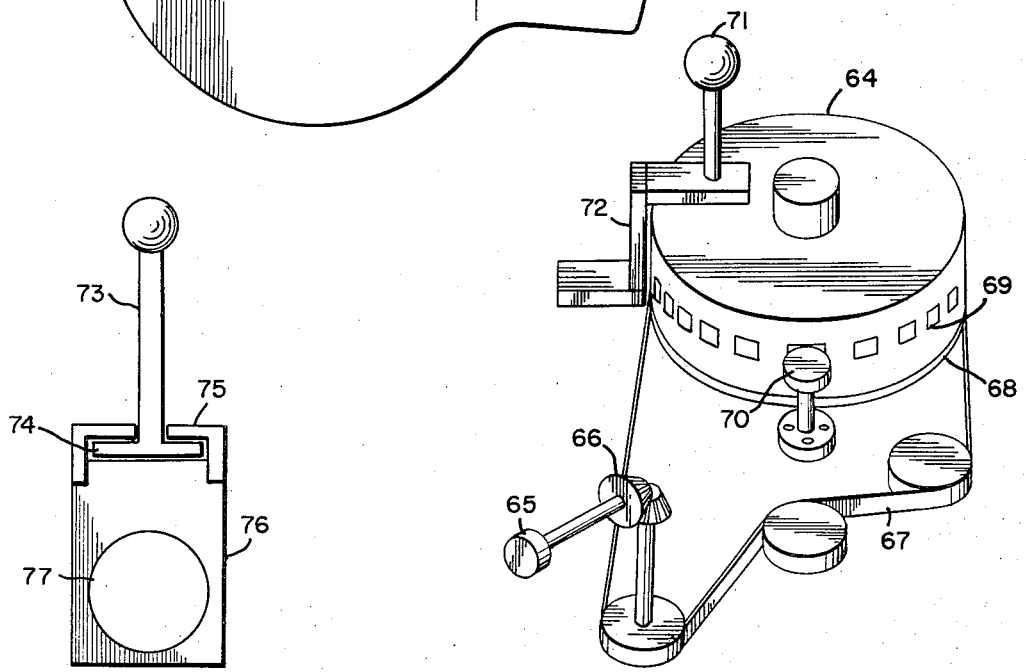
FIG. 7 is an exploded diagrammatic view of an optional drum arrangement.

It has been found workable to build a container for the filter arrangement described for fluorescent usage. For non-fluorescent measurements, a workable drum arrangement, shown in FIG. 7, is used although more costly than the single filter slot arrangement just noted. In FIG. 7 an internally slotted drum 64 is driven by a pulley arrangement 67 via a front panel knob 65 with geared coupling 66, the filter ejection being into the same location as slot 35. Pulley 67 rides in groove 68 and detent notches 69 are present for each filter position via the detent pawl 70.

Figure 8:
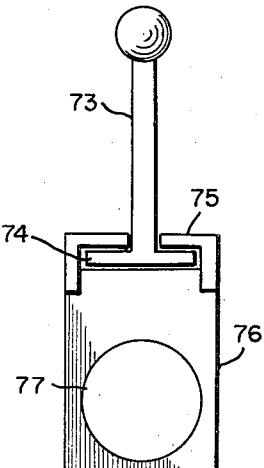
FIG. 8 is an enlarged top plan view of a fragment of FIG. 7 showing the filter ejection system.

A knob 71 is pressed down to cause filter ejection by a stem 74 mounted at the end of 73 in FIG. 8. This ejection device mounted on bracket 72 of FIG. 7 has it's stem 74 threading each filter holder 76 as knob 65 of FIG. 7 is turned from one position to the next. 74 threads through 75 as shown and filters are mounted in 77. Details are not shown since it has been found that more sophisticated slide projection devices of a similar type have recently appeared on the market so that it is not felt that there is anything of patentable merit in the drum per se.

The methods described for the colormeter improvement are fairly distinct and although minor variations in approach may be conceived by others such variations need not effect the merit of the present invention.

What is claimed is:

1. A measuring instrument including a lamp, a lens for receiving light from the lamp, a first beam-splitting mirror for receiving the light from the lens, a first light mask for defining the outline of a beam from the first beamsplitting mirror, a first cam for defining one edge of the beam, having an accurate position indicating means, a first mirror for reflecting the beam, a first transmission port to permit insertion of light attenuating materials into the beam for selected measurements a reference panel port and a reference panel for intercepting the beam and a first phototube for evaluating the light of the beam and for generating output signals proportional to the intensity of the beam incident thereon, a second cam for defining the edge of a second beam from the first beamsplitting mirror, a second mirror for reflecting the second beam, a second transmission port for insertion of samples whose transmission is to be measured, a sample reflectance port for defining a second beam for passing to a sample whose reflectance is to be measured and a second phototube for receiving and evaluating the second beam and for generating output signals proportional to the intensity of the beam incident thereon, a third mirror for reflecting additional light from the lamp, a zeroing aperture means for receiving light from the third mirror, a zeroing screw means for regulating the aperture, a zeroing aperture mirror means for receiving light from the aperture and for directing it in a third direction, and a light pipe for conducting the light from the zeroing aperture mirror, and for conducting the light to the second phototube, a second beamsplitting mirror for receiving light from the first beamsplitting mirror through the second light cam, a fourth mirror for deflecting one of the split beams from the second beamsplitting mirror, a third cam defining an edge of the deflected beam from the fourth mirror, so that the light from the third cam passes to the light pipe and from it to the second phototube, an electric circuit coupled to said phototubes for comparing the outputs of the phototubes and an instrument coupled to said circuit for indicating a comparison of the outputs of said phototubes.

2. A measuring instrument of claim 1 including a light filter means located in the path of light.

3. A measuring instrument of claim 2 wherein the light filtering means is located between the lamp and the first beamsplitting mirror.

4. A measuring instrument of claim 2 wherein said filter means is located between said reference panel port and said first phototube and also between said sample reference port and said second phototube.

5. A measuring instrument including a lamp, a lens for receiving light from the lamp, a first beamsplitting mirror for receiving light from the lens and cutting it into two beams, a first light mask for receiving one beam of the light from the first beamsplitting mirror and defining the beam, a first cam having an accurate position indicating means and defining the edge of the beam, a first mirror, for receiving light from the first beam and for deflecting it, a first transmission port for receiving and passing light from the beam, a reference panel port and reference panel, a first phototube for receiving a fixed portion of the reference panel reflection of the first beam, a second light beam from the first beamsplitting mirror, a second cam defining an edge of the second beam, a second mirror for reflecting the second beam, a second transmission port defining the perimeter of the second beam, a sample reflectance port through which a sample is exposed for reflectance by the second beam, a second phototube for receiving an essentially fixed portion of the sample reflection of the second beam, an electric circuit coupled to said two phototubes for receiving output signals generated by said phototubes and for comparing their magnitudes for the, an indicator of the comparison of the two phototubes, in combination with a second light mask positioned in the first light beam and having external handle means and linkage means, said linkage means connecting said second light mask to an external handle wherein motion of the handle in one direction causes said second light mask to move by rotary motion to a stop position against said cam, when the location of said cam is at an upper scale calibration point, said second light mask when in said stop position covering the opening of the first light mask said second light mask including a slotted aperture approximately perpendicularly located with respect to the line of contact with said cam, and said second light mask, when in said stop position, said slotted aperture being essentially midway between the sides of the opening of said first light mask and when the handle is moved in the other direction, said second light mask being moved by rotary motion wherein the opening of said first light mask is no longer covered at all by said second light mask.

6. A measuring instrument of claim 5 including a second cam in the light path of the second beam defining the edge of the second beam, a second beamsplitting mirror in the light path of the second beam beyond the second cam, said second beamsplitter establishing a third beam, a third cam defining the edge of the third beam beyond the second beamsplitter, a light pipe for receiving the third beam and transmitting it to the second phototube, a third mirror for receiving the light from the lamp and reflecting it, aperture means to receive the light from the third mirror, screw means establishing the zeroing of the light from the third mirror, the light from the third mirror being projected to the light pipe for transmission to the second phototube, filter means for the light from the first beam and drum means for said filter means for moving said filters into and out of said beam.

* * * * *